(12) United States Patent
Itakura et al.

(10) Patent No.: US 11,266,934 B2
(45) Date of Patent: Mar. 8, 2022

(54) METHOD AND SYSTEM FOR TREATING AQUEOUS FLUID RESULTING FROM FLUOROPOLYMER PRODUCTION STEP

(71) Applicant: Daikin Industries, LTD., Osaka (JP)

(72) Inventors: Shouji Itakura, Osaka (JP); Ryou Hatayama, Osaka (JP); Mihoko Ohashi, Osaka (JP); Michinobu Koizumi, Osaka (JP)

(73) Assignee: DAIKIN INDUSTRIES. LTD., Osaka (JP)

( * ) Notice: Subject to any disclaimer, the term of this patent is extended or adjusted under 35 U.S.C. 154(b) by 0 days.

(21) Appl. No.: 16/615,426

(22) PCT Filed: Jun. 27, 2018

(86) PCT No.: PCT/JP2018/024420
§ 371 (c)(1),
(2) Date: Nov. 21, 2019

(87) PCT Pub. No.: WO2019/004298
PCT Pub. Date: Jan. 3, 2019

(65) Prior Publication Data
US 2020/0171417 A1    Jun. 4, 2020

(30) Foreign Application Priority Data

Jun. 27, 2017  (JP) .............................. JP2017-125300

(51) Int. Cl.
*B01D 37/02* (2006.01)
*B01J 47/014* (2017.01)
(Continued)

(52) U.S. Cl.
CPC ........... *B01D 37/02* (2013.01); *B01D 61/025* (2013.01); *B01D 61/027* (2013.01); *B01D 61/04* (2013.01);
(Continued)

(58) Field of Classification Search
None
See application file for complete search history.

(56) References Cited

U.S. PATENT DOCUMENTS 3,680,699 A * 8/1972 MacPherson .......... B01D 24/12
                                                          210/778
4,369,266 A    1/1983 Kuhls et al.
(Continued)

FOREIGN PATENT DOCUMENTS

CN       1444503 A      9/2003
CN     101928078 A     12/2010
(Continued)

OTHER PUBLICATIONS

Extended European Search Report dated Nov. 19, 2020, issued by the European Patent Office in application 18825353.8.
(Continued)

*Primary Examiner* — Nicole M. Buie-Hatcher
(74) *Attorney, Agent, or Firm* — Sughrue Mion, PLLC

(57) ABSTRACT

A method for treating an aqueous fluid resulting from a fluorine-containing polymer production step, the method comprising:
    separating the aqueous fluid into a solid component and a filtrate using a filter aid.

10 Claims, 2 Drawing Sheets

(51) Int. Cl.
| | |
|---|---|
| *B01D 61/02* | (2006.01) |
| *B01D 61/04* | (2006.01) |
| *B01D 61/14* | (2006.01) |
| *B01D 61/16* | (2006.01) |
| *B01J 20/14* | (2006.01) |
| *B01J 20/20* | (2006.01) |
| *B01J 20/28* | (2006.01) |
| *B01J 41/12* | (2017.01) |
| *B01J 47/02* | (2017.01) |
| *C02F 9/00* | (2006.01) |
| *C08F 20/04* | (2006.01) |
| *B01J 39/07* | (2017.01) |
| *B01J 20/10* | (2006.01) |
| *C02F 1/28* | (2006.01) |
| *C02F 1/42* | (2006.01) |
| *C02F 1/44* | (2006.01) |
| *B01J 41/05* | (2017.01) |
| *B01J 39/05* | (2017.01) |
| *C02F 101/30* | (2006.01) |
| *C02F 103/38* | (2006.01) |

(52) U.S. Cl.
CPC .......... *B01D 61/145* (2013.01); *B01D 61/16* (2013.01); *B01J 20/106* (2013.01); *B01J 20/14* (2013.01); *B01J 20/20* (2013.01); *B01J 20/28004* (2013.01); *B01J 20/28016* (2013.01); *B01J 20/28033* (2013.01); *B01J 20/28052* (2013.01); *B01J 39/05* (2017.01); *B01J 39/07* (2017.01); *B01J 41/05* (2017.01); *B01J 41/12* (2013.01); *B01J 47/014* (2017.01); *B01J 47/02* (2013.01); *C02F 9/00* (2013.01); *C08F 20/04* (2013.01); *C02F 1/283* (2013.01); *C02F 1/42* (2013.01); *C02F 1/441* (2013.01); *C02F 1/442* (2013.01); *C02F 1/444* (2013.01); *C02F 2101/301* (2013.01); *C02F 2103/38* (2013.01); *C02F 2209/03* (2013.01); *C02F 2209/06* (2013.01)

(56) References Cited

U.S. PATENT DOCUMENTS

| | | | |
|---|---|---|---|
| 5,576,196 A | 11/1996 | Horn et al. | |
| 5,637,400 A | 6/1997 | Brekner et al. | |
| 6,613,941 B1 | 9/2003 | Felix et al. | |
| 8,461,230 B2 * | 6/2013 | Hoshikawa | C08J 3/05 523/335 |
| 8,859,645 B2 * | 10/2014 | Poggio | C08J 3/03 523/310 |
| 10,457,625 B2 | 10/2019 | Ohashi et al. | |
| 2003/0168405 A1 | 9/2003 | Ichida et al. | |
| 2006/0041051 A1 * | 2/2006 | Nakatani | C08F 14/26 524/544 |
| 2009/0057943 A1 | 3/2009 | Nishimura et al. | |
| 2012/0077043 A1 | 3/2012 | Hsu et al. | |
| 2012/0211421 A1 * | 8/2012 | Self | C04B 40/0042 210/640 |
| 2014/0048490 A1 | 2/2014 | Roelen et al. | |
| 2014/0256895 A1 * | 9/2014 | Brothers | B01J 20/18 526/255 |

FOREIGN PATENT DOCUMENTS

| | | | | |
|---|---|---|---|---|
| CN | 103408103 A | 11/2013 | | |
| EP | 0281417 A2 * | 9/1988 | .......... | C07C 209/16 |
| JP | 11-502403 A | 3/1999 | | |
| JP | 2002-516892 A | 6/2002 | | |
| JP | 2009-61619 A | 3/2009 | | |
| JP | 2011-104548 A | 6/2011 | | |
| JP | 2015-530237 A | 10/2015 | | |
| WO | 89/04847 A1 | 6/1989 | | |
| WO | 2013/111372 A1 | 8/2013 | | |
| WO | WO-2014059466 A1 * | 4/2014 | .......... | B01J 20/3248 |
| WO | 2017/069034 A1 | 4/2017 | | |

OTHER PUBLICATIONS

"Celite 545 filer aid, treated with sodium carbonate, flux calcined", CAS No. 68855-54-9, Nov. 11, 2020, Retrieved from the Internet URL:http://www.sigmaaldrich.com/catalog/product/sigald/22140?lang=enion=NL&gclid=CjwKCAiAtK79BRAIEiwA40skBtSLBp1YPOxwVKD3KtuclPT6gVylztGzbRs2bmZYPh-JSZUAtRn6rxoCDskQAvD_BwE [retrieved Nov. 24, 2020], 4 pages total, XP 055749177.

International Search Report dated Oct. 2, 2018 in International Application No. PCT/JP2018/024420.

International Preliminary Report on Patentability dated Dec. 31, 2019 in International Application No. PCT/JP2018/024420.

* cited by examiner

METHOD AND SYSTEM FOR TREATING AQUEOUS FLUID RESULTING FROM FLUOROPOLYMER PRODUCTION STEP

TECHNICAL FIELD

The present invention relates to a method and a system for treating an aqueous fluid resulting from a fluorine-containing polymer production step.

BACKGROUND ART

Fluorine-containing polymers such as fluororesins and fluoroelastomers are produced by homopolymerizing or copolymerizing fluorine-containing monomers. Fluorine-containing polymers are usually produced by emulsion polymerization or suspension polymerization, and a fluorine-containing surfactant is used as an emulsifier. Accordingly, an aqueous fluid such as a waste liquid resulting from a fluorine-containing polymer production step usually contains fluorine-containing compounds such as a fluorine-containing surfactant. Since fluorine-containing compounds in general may be poorly biodegradable. Concerning about the effect on environment, fluorine-containing compounds need to be removed or recovered from a waste liquid or the like to prevent fluorine-containing compounds from being discharged into the surrounding environment. Also, fluorine-containing surfactants in general are expensive and, therefore, are desirably recovered and reused.

Aqueous fluids such as a waste liquid resulting from the fluorine-containing polymer production step may contain, in addition to a fluorine-containing compound such as a fluorine-containing surfactant, solid components such as an uncoagulated or particulate fluorine-containing polymer. Such solid components may adversely affect the process of removing or recovering a fluorine-containing compound, and are thus desirably removed from the aqueous fluid before removing or recovering the fluorine-containing compound.

As a method for treating a waste liquid or the like resulting from a fluorine-containing polymer production step, Patent Literature 1 discloses a method for treating wastewater containing fluoropolymer resin waste solids comprising; passing the wastewater through hollow fiber membranes to separate fluoropolymer resin waste solids and produce treated filtrate water; and removing the fluoropolymer resin waste solids from the wastewater.

CITATION LIST

Patent Literature

Patent Literature 1: Japanese Patent Laid-Open No. 2015-530237

SUMMARY OF INVENTION

Technical Problem

In the method described in Patent Literature 1, solid components contained in waste liquid are removed from the waste liquid by a hollow fiber membrane. However, it was found from the research conducted by the present inventors that the hollow fiber membrane can be easily clogged with solid components and has the problem of significantly impaired treatment efficiency.

The present invention has been conceived in view of such a problem, and an object of the present invention is to provide a method and a system capable of highly efficiently treating an aqueous fluid resulting from a fluorine-containing polymer production step.

Solution to Problem

As a result of having conducted diligent research, the present inventors found that a decrease of treatment efficiency caused by the clogging of a filter such as a filtration membrane can be suppressed by separating solid components using a filter aid and, as a result, an aqueous fluid resulting from a fluorine-containing polymer production step can be highly efficiently treated, and the inventors thus accomplished the present invention.

According to the first aspect of the present invention, provided is a method for treating an aqueous fluid resulting from a fluorine-containing polymer production step, the method comprising:

separating the aqueous fluid into a solid component and a filtrate using a filter aid.

According to the second aspect of the present invention, provided is a system for treating an aqueous fluid resulting from a fluorine-containing polymer production step, the system comprising:

a first filtration apparatus that separates the aqueous fluid into a solid component and a filtrate using a filter aid.

Advantageous Effects of Invention

Having the above features, the present invention is capable of highly efficiently treating an aqueous fluid resulting from a fluorine-containing polymer production step.

DESCRIPTION OF EMBODIMENT

Below, one embodiment of the present invention will now be described in detail with reference to the drawings, but the present invention is not limited to such an embodiment.

[Method for Treating Aqueous Fluid Resulting from Fluorine-Containing Polymer Production Step]

Figure 1:
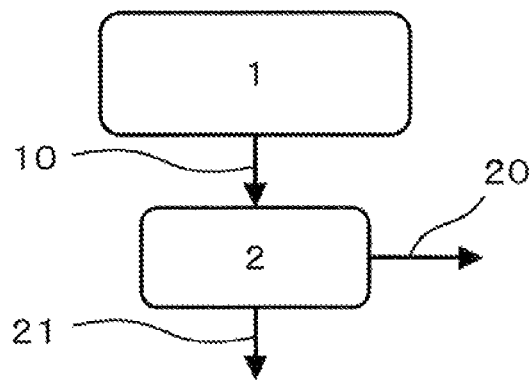
FIG. 1 is a schematic diagram illustrating a method according to one embodiment of the present invention.

The method according to one embodiment of the present invention is a method for treating an aqueous fluid resulting from a fluorine-containing polymer production step, the method comprising separating the aqueous fluid into a solid component and a filtrate using a filter aid. In the method according to the present embodiment, the aqueous fluid may be separated into a solid component and a filtrate using a filter aid and a filter aid retaining member. FIG. 1 schematically shows the method according to the present embodiment.

(Solid-Liquid Separation)

As shown in FIG. 1, an aqueous fluid 10 resulting from a fluorine-containing polymer production step 1 is separated into a solid component 20 and a filtrate 21 using a filter aid and a filter aid retaining member (solid-liquid separation 2).

Below, a filtration apparatus that performs this solid-liquid separation 2 will also be referred to as a "first filtration apparatus".

Aqueous Fluid

The aqueous fluid that can be treated by the method of the present embodiment is not limited as long as the aqueous fluid results from the fluorine-containing polymer production step, and various aqueous fluids can be treated. While specific examples of the aqueous fluid will be described below, the aqueous fluid is typically a waste liquid resulting from the production of a fluorine-containing polymer. In the present specification, the "aqueous fluid" includes an aqueous solution, a dispersion, and a liquid obtained by liquefying a gas (such as a discharge gas resulting from a drying step that will be described below). The aqueous fluid contains an aqueous medium such as water. Herein, the "aqueous medium" means water and a mixed medium containing water and a water-soluble organic solvent (for example, alcohols such as methanol, ethanol, and propanol, esters such as methyl acetate, ketones such as acetone, and ethers such as dimethyl ether).

Herein, the "fluorine-containing polymer production step" means the entire step of producing a fluorine-containing polymer by polymerizing one or more monomers including a fluorine-containing monomer, and is not limited to any particular production step. The fluorine-containing polymer is generally produced by subjecting a fluorine-containing monomer to emulsion polymerization or suspension polymerization. In emulsion polymerization and suspension polymerization, a fluorine-containing surfactant can be used as an emulsifier.

Herein, the "fluorine-containing monomer" is not limited as long as the fluorine-containing monomer has at least one fluorine or fluoroalkyl group, and examples include trifluoroethylene, tetrafluoroethylene (TFE), vinylidene fluoride (VdF), vinyl fluoride (VF), chlorotrifluoroethylene (CTFE), hexafluoropropylene (HFP), hexafluoroisobutylene, perfluoroalkylethylene, and fluorovinyl ether (FVE).

Herein, the "fluorine-containing polymer" may be obtained by polymerizing monomers including one or more fluorine-containing monomers described above, and, for example, may include, but are not limited to, one or more fluorine-containing polymers as follows: polytetrafluoroethylene (PTFE) obtained by homopolymerizing TFE, copolymers of TFE and other monomers that are copolymerizable with TFE (for example, fluorine-containing monomers such as vinylidene fluoride, hexafluoropropylene, chlorotrifluoroethylene, and perfluoro(alkyl vinyl ether), hydrocarbon olefins such as ethylene, propylene, and isobutene, and alkyl vinyl ether) (for example, tetrafluoroethylene-hexafluoropropylene copolymer (FEP), tetrafluoroethylene-perfluoro (alkyl vinyl ether) copolymer (PFA), and ethylene-tetrafluoroethylene copolymer (ETFE)), fluororesins such as polyvinylidene fluoride (PVDF), polychlorotrifluoroethylene (PCTFE), and ethylene-chlorotrifluoroethylene (ECTFE), vinylidene fluoride rubbers (FKM) such as vinylidene fluoride-hexafluoropropylene copolymer, fluoroelastomers such as tetrafluoroethylene-propylene rubber (FEPM) and tetrafluoroethylene-perfluoromethyl vinyl ether rubber (FFKM), and fluorine-containing elastomers. Herein, the "fluorine-containing polymer" also includes a low molecular weight polymer having a molecular weight of about 10000 to 500000 (such as low molecular weight PTFE).

Herein, the "fluorine-containing polymer production step" is not limited as long as the fluorine-containing polymer production step is a step included in the production process of a fluorine-containing polymer, and may include one or more steps that constitute a known fluorine-containing polymer production process. The "fluorine-containing polymer production step" may also include, in addition to a polymerization step of polymerizing one or more monomers including a fluorine-containing monomer, a pre-treatment step (such as a step of preparing an emulsifier having a predetermined concentration) prior to the polymerization step and a post-treatment step (such as a solid-liquid separation step, a coagulation step, a washing step, a dehydration step, a drying step, and a heat treatment step) after the polymerization step. Below, a specific example of the "fluorine-containing polymer production step" will be described, but the method according to the present embodiment is not limited to the following specific example.

As described above, the fluorine-containing polymer is produced by polymerizing one or more monomers including a fluorine-containing monomer. The fluorine-containing polymer is generally produced by emulsion polymerization or suspension polymerization. In the polymerization step, an emulsion in which polymer particles are dispersed in an aqueous medium is obtained. After this polymerization step, a salt or an acid is added to the emulsion to cause the fluorine-containing polymer to aggregate in the coagulation step. Then, the aggregated fluorine-containing polymer is separated and recovered in the solid-liquid separation step. The discharge liquid remaining after separating and recovering the fluorine-containing polymer (a coagulation discharge liquid) may be included in the "aqueous fluid" herein.

The fluorine-containing polymer separated and recovered in the solid-liquid separation step may be washed with a washing liquid such as an aqueous medium in the washing step. The washing liquid used in the washing step (a washing discharge liquid) may be included in the "aqueous fluid" herein. The fluorine-containing polymer separated and recovered in the solid-liquid separation step may be mechanically dehydrated in the dehydration step. The discharge liquid removed from the fluorine-containing polymer in the dehydration step (a dehydration discharge liquid) may be included in the "aqueous fluid" herein. The fluorine-containing polymer after dehydration may be washed with a washing liquid, and the washing liquid used in this washing step (a washing discharge liquid) can also be included in the "aqueous fluid" herein.

The fluorine-containing polymer obtained after the washing step and/or dehydration step described above may be heated and dried in the drying step to remove the remaining moisture and organic solvent as discharge gas. A liquid obtained by liquefying the discharge gas resulting from the drying step may be included in the "aqueous fluid" herein. The discharge gas resulting from the drying step may include, in addition to water vapor and an organic solvent, a gas resulting from vaporization of a fluorine-containing compound such as a fluorine-containing surfactant accompanying the fluorine-containing polymer. Accordingly, this discharge gas is preferably washed with a washing liquid such as water or an alkaline aqueous solution. The washing liquid used in washing the discharge gas (a washing discharge liquid) may also be included in the "aqueous fluid" herein.

The fluorine-containing polymer obtained after the drying step may be formed into a desired shape such as pellets in the heat treatment step. A liquid obtained by liquefying the discharge gas resulting from the heat treatment step may be included in the "aqueous fluid" herein. The discharge gas resulting from the heat treatment step may include a gas resulting from vaporization of a fluorine-containing compound such as a fluorine-containing surfactant accompanying the fluorine-containing polymer. Accordingly, this discharge gas is preferably washed with a washing liquid such as water or an alkaline aqueous solution. The washing liquid used in washing the discharge gas (a washing discharge liquid) may also be included in the "aqueous fluid" herein.

Both the discharge gas resulting from the drying step and the discharge gas resulting from the heat treatment step may be washed together to obtain a single washing discharge water.

The aqueous fluid may be an aqueous fluid resulting from the production step of one fluorine-containing polymer, or may contain aqueous fluids resulting from the production steps of a plurality of different fluorine-containing polymers. For example, the aqueous fluid may be a mixture containing an aqueous fluid resulting from the step of producing a fluoroelastomer and an aqueous fluid resulting from the step of producing PTFE (such as low molecular weight PTFE), and according to the method of the present embodiment, aqueous fluids such as waste liquids resulting from the steps of producing two fluorine-containing polymers can be simultaneously treated. Also, the aqueous fluid may be an aqueous fluid resulting from one of the steps included in the fluorine-containing polymer production process, or may contain aqueous fluids resulting from a plurality of different steps.

Fluorine-Containing Surfactant

The aqueous fluid may contain a fluorine-containing compound obtained in a fluorine-containing polymer production process. For example, the aqueous fluid may contain a fluorine-containing surfactant. Herein, the "fluorine-containing surfactant" means a surfactant containing a fluorine atom. The fluorine-containing surfactant may be the same as the fluorine-containing surfactant used as an emulsifier in the fluorine-containing polymer production process, or may be a derivative of the fluorine-containing surfactant used as an emulsifier.

The fluorine-containing surfactant that may be contained in the aqueous fluid is not limited. Examples of the fluorine-containing surfactant include fluorine-containing carboxylic acids and salts thereof as well as fluorine-containing sulfonic acids and salts thereof.

Examples of fluorine-containing carboxylic acids include compounds represented by formula (i) below:

$$X\text{—}Rf\text{—}COOH \tag{i}$$

wherein X is H, F, or Cl; and Rf is a $C_{1-20}$ linear or branched fluoroalkylene group, a $C_{1-20}$ group having a monooxyfluoroalkylene group, or a $C_{1-20}$ group having a polyoxyfluoroalkylene group.

Examples of the $C_{1-20}$ linear or branched fluoroalkylene group in the Rf group include $CF_2$, $C_2F_4$, $C_3F_6$, $C_4F_8$, $C_5F_{10}$, $C_6F_{12}$, $C_7F_{14}$, $C_8F_{16}$, CHF, $C_2F_3H$, $C_2F_2H_2$, $C_2FH_3$, $C_3F_5H$, $C_3F_4H_2$, $C_3F_3H_3$, $C_3F_2H_4$, $C_3F_1H_5$, $C_4F_7H$, $C_4F_6H_2$, $C_4F_5H_3$, $C_4F_4H_4$, $C_4F_3H_5$, $C_4F_2H_6$, $C_4FH_7$, $C_5F_9H$, $C_5F_8H_2$, $C_5F_7H_3$, $C_5F_6H_4$, $C_5F_5H_5$, $C_5F_4H_6$, $C_5F_3H_7$, $C_5F_2H_8$, $C_5FH_9$, $C_6F_{11}H$, $C_6F_{10}H_2$, $C_6F_9H_3$, $C_6F_8H_4$, $C_6F_7H_5$, $C_6F_6H_6$, $C_6F_5H_7$, $C_6F_4H_8$, $C_6F_3H_9$, $C_6F_2H_{10}$, $C_6FH_{11}$, $C_7F_{13}H$, $C_7F_{12}H_2$, $C_7F_{11}H_3$, $C_7F_{10}H_4$, $C_7F_9H_5$, $C_7F_8H_6$, $C_7F_7H_7$, $C_7F_6H_8$, $C_7F_5H_9$, $C_7F_4H_{10}$, $C_7F_3H_{11}$, $C_7F_2H_{12}$, $C_7F_1H_{13}$, $C_8F_{15}H$, $C_8F_{14}H_2$, $C_8F_{13}H_3$, $C_8F_{12}H_4$, $C_8F_{11}H_5$, $C_8F_{10}H_6$, $C_8F_9H_7$, $C_8F_8H_8$, $C_8F_7H_9$, $C_8F_6H_{10}$, $C_8F_5H_{11}$, $C_8F_4H_{12}$, $C_8F_3H_{13}$, $C_8F_2H_{14}$, and $C_8FH_{15}$.

Examples of the $C_{1-20}$ group having a monooxyfluoroalkylene group and the $C_{1-20}$ group having a polyoxyfluoroalkylene group in the Rf group include groups represented by formulae (a) to (g) below:

$$(CF_2)_l\text{—}(CF_2OCF_2)_m\text{—}(CF_2OCF(CF_3))_n \tag{a}$$

$$(CF_2)_l\text{—}(CHFOCF_2)_m\text{—}(CF_2OCF(CF_3))_n \tag{b}$$

$$(CF_2)_l\text{—}(CF_2OCHF)_m\text{—}(CF_2OCF(CF_3))_n \tag{c}$$

$$(CHF)_l\text{—}(CF_2OCF_2)_m\text{—}(CF_2OCF(CF_3))_n \tag{d}$$

$$(CHF)_l\text{—}(CHFOCF_2)_m\text{—}(CF_2OCF(CF_3))_n \tag{e}$$

$$(CHF)_l\text{—}(CF_2OCHF)_m\text{—}(CF_2CF(CF_3))_n \tag{f}$$

$$(CF_2OCF_2)_m\text{—}(CF_2)_l\text{—}(CF_2CHFCF_2)_n \tag{g}$$

wherein l, m, and n are integers satisfying $l \geq 0$, $m \geq 0$, $n \geq 0$, and $1 \leq l+2m+3n \leq 20$. In the above formulae, each repeating unit within parentheses may be present in any order.

The number of carbon atoms contained in the Rf group is preferably 1 to 8 and more preferably 1 to 6. For example, the Rf group is preferably a $C_{1-8}$ (preferably $C_{1-6}$) linear or branched fluoroalkylene group, a $C_{1-8}$ (preferably $C_{1-6}$) group having a monooxyfluoroalkylene group, or a $C_{1-8}$ (preferably $C_{1-6}$) group having a polyoxyfluoroalkylene group.

In one embodiment, the number of carbon atoms contained in the Rf group is preferably 3 to 8 and more preferably 3 to 6. For example, the Rf group is preferably a $C_{3-8}$ (preferably $C_{3-6}$) linear or branched fluoroalkylene group, a $C_{3-8}$ (preferably $C_{3-6}$) group having a monooxyfluoroalkylene group, or a $C_{3-8}$ (preferably $C_{3-6}$) group having a polyoxyfluoroalkylene group.

Examples of fluorine-containing carboxylic acids in a preferable embodiment include $CF_3OCF(CF_3)CF_2OCF(CF_3)COOH$, $CF_3CF_2OCF_2CF_2OCF_2COOH$, $CF_3OCF_2CF_2CF_2OCHFCF_2COOH$, $CF_3(CF_2)_4COOH$, $CF_3(CF_2)_6COOH$, $CF_3CF_2CF_2OCF(CF_3)COOH$, $H(CF_2)_6COOH$, $H(CF_2)_4COOH$, $CH_3CF_2CF_2OCF(CF_3)CF_2OCF(CF_3)COOH$, and $CH_3CF_2CF_2OCF(CF_3)COOH$.

Examples of the fluorine-containing sulfonic acids described above include $C_{1-20}$ perfluoroalkylsulfonic acids, perfluoromonooxyalkylsulfonic acids, and perfluoroalkylethanesulfonic acids. Preferable examples of the fluorine-containing sulfonic acids include $CF_3(CF_2)_nSO_3H$ wherein n=2 to 8, $CF_3CF_2OCF_2CF_2SO_3H$, and $CF_3(CF_2)_nCH_2CH_2SO_3H$ wherein n=2 to 8).

Examples of the salts of fluorine-containing carboxylic acids and fluorine-containing sulfonic acids described above include salts having a monovalent cation as a counter ion, e.g., alkali metal salts such as potassium salts and sodium salts, ammonium salts, and amine salts (e.g., alkylamine salts such as methylamine, dimethylamine, trimethylamine, ethylamine, diethylamine, and triethylamine).

The aqueous fluid may contain one fluorine-containing surfactant, and may contain two or more fluorine-containing surfactants.

In the method according to the present embodiment, the concentration of the fluorine-containing surfactant in the aqueous fluid is not limited, and the aqueous fluid having any concentration of the fluorine-containing surfactant can be treated. The concentration of the fluorine-containing surfactant in the aqueous fluid can vary according to the fluorine-containing polymer production step from which the aqueous fluid results, and may be about 0.1 ppm to about 10000 ppm, e.g., 1 ppm to 5000 ppm, such as 50 ppm to 500 ppm. The aqueous fluid resulting from the fluorine-containing polymer production step can be treated as-is in the method according to the present embodiment without pretreatment, but pre-treatment such as dilution may be suitably performed. Herein, ppm means a value determined in terms of mass unless specified otherwise.

The aqueous fluid may contain solid components such as a fluorine-containing polymer. The solid components are components that may remain in the discharge liquid (the aqueous fluid) after the fluorine-containing polymer produced in the fluorine-containing polymer production step is separated and recovered. For example, the coagulation discharge liquid described above may contain an uncoagulated polymer and/or a particulate polymer not completely recovered in the solid-liquid separation step. Herein, the "uncoagulated polymer" means a polymeric component which presents in an dispersed manner in an aqueous fluid remaining after performing the polymerization step, then adding a flocculant, and performing the solid-liquid separation step to separate and recover the fluorine-containing polymer, and deposits as gelated matter on the surface of a filter medium such as a filter. The particle size of the particulate polymer that may be contained in the aqueous fluid is not limited, and the particulate polymer may be polymer particles having a particle size of, for example, about 0.1 μm to 0.2 μm. The aqueous fluid may contain either an uncoagulated polymer or a particulate polymer, or may contain both an uncoagulated polymer and a particulate polymer. The method according to the present embodiment is particularly useful when the solid components contain an uncoagulated polymer as will be described below. When the aqueous fluid contains both an uncoagulated polymer and a particulate polymer, the particulate polymer may cling to the uncoagulated polymer, thus making it possible to more efficiently perform the solid-liquid separation using a filter aid described below.

In the method according to the present embodiment, the concentration of solid components in the aqueous fluid is not limited, and the aqueous fluid having any concentration of solid components can be treated. The concentration of solid components in the aqueous fluid may vary according to the fluorine-containing polymer production step from which the aqueous fluid results, and may be about 0.1 ppm to about 5000 ppm, e.g., 1 ppm to 500 ppm.

The aqueous fluid may contain, in addition to the fluorine-containing surfactant and/or solid components described above, flocculants such as nitric acid; aluminum salts such as aluminum sulfate and polyaluminum chloride (PAC); iron salts such as ferrous hydroxide, ferric hydroxide, ferrous sulfate, ferric sulfate, and polyferric sulfate; calcium salts such as calcium hydroxide, calcium chloride, calcium sulfate, calcium carbonate, calcium nitrate, and calcium fluoride; silicate minerals containing metal elements that has a valency of 2 or more and silicon, such as kaolinite, montmorillonite, and zeolite; sodium alginate, chitin/chitosan flocculants, and polymer flocculants such as cationic polymer flocculants, anionic polymer flocculants, and nonionic polymer flocculants. These flocculants may be those used as flocculants in the fluorine-containing polymer production step, and/or the above flocculants may be further added to the aqueous fluid before performing solid-liquid separation in the method according to the present embodiment. When the aqueous fluid contains a particulate polymer as a solid component, the aqueous fluid preferably contains a flocculant. With a flocculant being contained, separation of the solid component using a filter aid, which will be described below, can be more efficiently performed.

The aqueous fluid is preferably acidic. Specifically, the pH of the aqueous fluid is preferably less than 5. When the aqueous fluid is acidic and preferably has a pH of less than 5, dissolution of solid components that may be present in the aqueous fluid is promoted, and thus the aqueous fluid can be more efficiently treated.

Filter Aid

The aqueous fluid described above is separated into solid components and a filtrate using a filter aid and a filter aid retaining member. The filter aid is generally used to improve filtration characteristics, such as reducing filtration resistance and preventing blocking of a filter medium, and is usually a particulate, powdery, or fibrous material. In the method according to the present embodiment, the filter aid functions to capture the solid components in the aqueous fluid.

As described above, the aqueous fluid resulting from the fluorine-containing polymer production step may contain a fluorine-containing surfactant. The fluorine-containing surfactant is generally expensive and thus desirably recovered from the aqueous fluid and reused in the fluorine-containing polymer production step or the like. Also, the fluorine-containing surfactant is generally has poor biodegradability. Concerning about the effect on environment, it needs to be recovered from the aqueous fluid to prevent discharge into the surrounding environment. Accordingly, there is a demand for a method for treating the aqueous fluid to recover the fluorine-containing surfactant. However, the aqueous fluid may contain solid components as described above, and the solid components may adversely affect the aqueous fluid treatment system. For example, when recovering the fluorine-containing surfactant by way of membrane separation, the solid components may cause blocking (clogging) of a filtration membrane. Accordingly, the solid components need to be removed from the aqueous fluid to prevent, for example, clogging of the aqueous fluid treatment system.

As a conventional method for removing solid components, there is a method in which the solid components are separated by a hollow fiber membrane (Patent Literature 1). However, it was found from the research conducted by the present inventors that the hollow fiber membrane can be easily clogged with solid components and has the problem of significantly impaired treatment efficiency. On the other hand, the method of the present embodiment is characterized in that solid components are separated from an aqueous fluid using a filter aid. In the method according to the present embodiment, the filter aid captures solid components in an aqueous fluid, thus the method can prevent the filter aid retaining member and the filter membrane from being clogged, which is not achievable with the conventional method, and, as a result, the method exerts the remarkable effect of being capable of increasing the efficiency of treating the aqueous fluid. The filter aid can highly efficiently capture and separate solid components such as a uncoagulated polymer and a particulate polymer contained in the aqueous fluid, and, thus, when concentrating and recovering a fluorine-containing surfactant that may be contained in the aqueous fluid by membrane filtration, the load on membrane filtration can be reduced, and the service life (durability) of the filtration membrane can be extended.

According to the present embodiment, the removal ratio of solid components in the aqueous fluid can be, for example, 90% or more and specifically 99.9% or more by separating the aqueous fluid into solid components and a filtrate using a filter aid. The solid component removal ratio can be determined according to the following expression:

Solid component removal ratio $(\%) = (1-(\beta/\alpha)) \times 100$ wherein α is the filtrate quality (mg/l) of an aqueous fluid (raw water before separation using a filter aid), and β is the filtrate quality (mg/l) of a filtrate (liquid obtained by separation using a filter aid). By highly efficiently capturing and separating solid components, it is possible to suppress deterioration of treatment efficiency caused by the clogging of a filtration membrane or the like when membrane filtration or the like is continuously performed after capturing and separating solid components.

In the method according to the present embodiment, the filter aid may be added to the aqueous fluid. Filtration performed while directly adding a filter aid to a filtration-target liquid in this way is generally referred to as "body feed". When performing solid-liquid separation in a first filtration apparatus, body feed can be performed by adding the filter aid to the aqueous fluid that is before being fed to the first filtration apparatus. Body feed can effectively suppress an increase of filtration pressure and, therefore, has the advantages of being capable of increasing the amount of the aqueous fluid treated per unit time and being capable of performing filtration operation for a long period of time while maintaining a high filtration rate. Also, when solid components in the aqueous fluid contain an uncoagulated polymer, the solid components can be more effectively captured by body feed.

In the method according to the present embodiment, a layer of the filter aid may be formed on the surface of the filter aid retaining member. Forming a layer of the filter aid on the surface of the filter aid retaining member prior to filtration in this way is generally referred to as "precoat". Precoat can effectively prevent blocking of the filter aid retaining member and, therefore, can suppress an increase of filtration pressure and, as a result, can increase the amount of the aqueous fluid treated per unit time.

In the method according to the present embodiment, body feed or precoat may be performed independently, or body feed and precoat may be combined. By combining body feed and precoat, solid components in the aqueous fluid can be more efficiently captured, moreover an increase of filtration pressure can be even more suppressed, and therefore highly efficient solid-liquid separation can be achieved over a long period of time.

The filter aid usable in the method according to the present embodiment is not limited, and may contain, for example, at least one selected from the group consisting of diatomaceous earth, filter sand (such as manganese sand, manganese zeolite, activated carbon, anthracite, and ceramic sand), perlite, and cellulose.

The filter aid is preferably diatomaceous earth. Diatomaceous earth is particularly useful for separating solid components from an aqueous fluid because it can effectively capture solid components contained in the aqueous fluid resulting from the fluorine-containing polymer production step.

The larger the particle size of the filter aid is, the more suppressed the increase of filtration pressure is, resulting in a higher filtration rate, and thus the amount of the aqueous fluid treated per unit time can be increased. On the other hand, the smaller the particle size of the filter aid is, the greater the solid component capturing effect is, and thus the solid component concentration in the filtrate can be further reduced.

The average particle size of the filter aid is preferably 1 to 1000 μm, more preferably 1 to 500 μm, even more preferably 1 to 200 μm, further preferably 10 to 100 μm, and particularly preferably 20 to 60 μm. When the average particle size of the filter aid is 20 μm or more, preferably 40 μm or more, more preferably 60 μm or more, and even more preferably 80 μm or more, the filtration rate can be more increased, and the amount of the aqueous fluid treated per unit time can be more increased. When the average particle size of the filter aid is 80 μm or less, preferably 60 μm or less, more preferably 40 μm or less, and even more preferably 20 μm or less, the effect of capturing solid components is even more increased, and the concentration of solid components contained in the filtrate obtained by solid liquid separation (filtration) can be even more reduced. Herein, the "average particle size" means a volume-based average particle size (a volume-average particle size) as measured using a laser diffraction particle size distribution measurement apparatus.

The filter aid is preferably diatomaceous earth having an average particle size of 20 to 60 μm.

The amount of the filter aid used in solid-liquid separation can be suitably set according to the type of the aqueous fluid to be treated, the type of the filter aid to be used, and the like, and is not limited to a specific amount. For example, the amount of the filter aid added to the aqueous fluid in body feed may be an amount such that the concentration of the filter aid in the aqueous fluid is 1 to 10000 ppm, preferably 10 to 1000 ppm, and more preferably 20 to 100 ppm. The amount of the filter aid used in precoat may be an amount such that the thickness of the filter aid layer formed on the surface of the filter aid retaining member is 0.5 to 10 mm and preferably 1 to 7 mm.

Filter Aid Retaining Member

By retaining the filter aid, the filter aid retaining member functions to separate (solid-liquid separate) the aqueous fluid into solid components captured by the filter aid and a filtrate. When performing solid-liquid separation in the first filtration apparatus, the first filtration apparatus includes the filter aid retaining member. The filter aid retaining member may be, for example, a fabric-like member such as filter cloth, filter paper, or metal mesh, a porous material such as sintered metal or sponge, or a filler such as gravel or sand. The type of the filter aid retaining member to be used can be suitably selected according to the conditions such as the aqueous fluid to be treated.

The pore size of the filter aid retaining member can be suitably set according to the particle size of the filter aid to be used. The pore size of the filter aid retaining member may be, for example, 1 to 1000 μm. The smaller the pore size of the filter aid retaining member is, the more securely the filter aid can be retained. On the other hand, the larger the pore size of the filter aid retaining member is, the smaller the pressure loss during filtration can be. When using diatomaceous earth as a filter aid, the pore size of the filter aid retaining member is preferably smaller than the average particle size of the filter aid, and is preferably, for example, 60% or less of the average particle size of the filter aid. The material constituting the filter aid retaining member is not limited, and examples include synthetic fibers of polypropylene, polyester, polyamide, polyimide, polyacrylonitrile, polytetrafluoroethylene (PTFE), polyphenylene sulfide (PPS), vinylidene chloride, and vinylon, glass fiber, and cotton.

Solid Component

By the method according to the present embodiment, the aqueous fluid is separated into solid components and a filtrate that has a lower solid component concentration than the aqueous fluid. The details of the solid components are as described above. The method according to the present embodiment can separate an uncoagulated polymer and a particulate polymer having a particle size of about 0.01 μm to about 5 µm, such as 0.01 to 1 µm, e.g., 0.05 to 0.5 µm from the aqueous fluid. In particular, separation of an uncoagulated polymer is extremely difficult with a conventional method involving a filtration membrane or the like, but by the method according to the present embodiment, an uncoagulated polymer can be removed and separated from the aqueous fluid using a filter aid. Accordingly, the method according to the present embodiment is particularly useful when the solid components contain an uncoagulated polymer. Moreover, when the solid components contain both an uncoagulated polymer and a particulate polymer, the particulate polymer clings to the uncoagulated polymer, thus making it possible to more efficiently perform separation of the solid components.

Filtrate

By the method according to the present embodiment, a filtrate having a lower solid component concentration than the aqueous fluid can be obtained. The solid component concentration in the filtrate is preferably 1.0 mg/l or less, more preferably 0.5 mg/l or less, and even more preferably 0.05 mg/l or less. Particularly preferably, the filtrate is substantially free of solid components.

The filtrate is preferably acidic. Specifically, the pH of the filtrate is preferably less than 5. When the filtrate is acidic and preferably has a pH of less than 5, production of solid components in the filtrate can be suppressed, and membrane filtration can be performed more efficiently.

When the aqueous fluid contains a fluorine-containing surfactant, a filtrate containing a fluorine-containing surfactant can be obtained by the method according to the present embodiment. The concentration of the fluorine-containing surfactant in the filtrate can be considered substantially the same as the concentration of the fluorine-containing surfactant in the aqueous fluid. The fluorine-containing surfactant contained in the filtrate may be concentrated and recovered by membrane filtration (and optionally adsorption) that will be described below.

In the method according to the present embodiment, the aqueous fluid is preferably separated into solid components and a filtrate by pressure filtration. Pressure filtration enables solid-liquid separation by the method according to the present embodiment to be more efficiently performed. When performing solid-liquid separation by pressure filtration, a pressure filtration machine may be used as the first filtration apparatus. The type of a usable pressure filtration machine is not limited, and a known apparatus can be suitably used. For example, pressure filtration may be performed using a pressure filtration machine equipped with a candle filter. When a pressure filtration apparatus is used, applying internal pressure makes it possible to periodically peel off a cake layer formed on the surface of the filter aid retaining member and makes it possible to stably treat the aqueous fluid over a long period of time. Alternatively, the aqueous fluid may be separated into solid components and a filtrate by filtration under reduced pressure. When performing pressure filtration or filtration under reduced pressure, the filtration pressure can be suitably set according to the aqueous fluid to be treated, the filter aid and filter aid retaining member to be used, the type of the filtration apparatus, and the like.

(Membrane Filtration)

Figure 2:
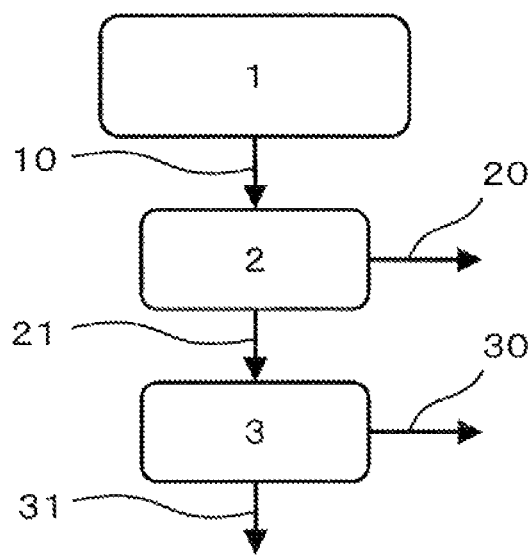
FIG. 2 is a schematic diagram illustrating one modification of the embodiment shown in FIG. 1 FIG. 1.

In some cases, the method according to the present embodiment may further include separating the filtrate into a permeated liquid and a concentrated liquid using a filtration membrane. FIG. 2 schematically shows the method of the present embodiment in the case of concentrating the filtrate using a filtration membrane.

As shown in FIG. 2, the filtrate 21 obtained in the solid-liquid separation 2 described above is separated into a permeated liquid 30 and a concentrated liquid 31 using a filtration membrane (membrane filtration 3). Hereinafter, the filtration apparatus that performs this membrane filtration 3 is also referred to as a "second filtration apparatus".

Filtration Membrane

By allowing the filtrate to pass through a filtration membrane, the components contained in the filtrate can be concentrated to give a concentrated liquid. When performing membrane filtration in the second filtration apparatus, the second filtration apparatus includes a filtration membrane. A reverse osmosis membrane, a nanofiltration membrane, or an ultrafiltration membrane may be used as a filtration membrane. The filtration membrane is preferably a reverse osmosis membrane. A reverse osmosis membrane can effectively prevent permeation of a fluorine-containing surfactant and, thus, when the filtrate contains a fluorine-containing surfactant, the use of a reverse osmosis membrane makes it possible to obtain a concentrated liquid containing a fluorine-containing surfactant in a higher concentration.

The type of a filtration membrane used in the method according to the present embodiment is not limited, and may be suitably selected according to the component to be concentrated (such as a fluorine-containing surfactant), membrane filtration conditions, and the like. Any one of a reverse osmosis membrane, a nanofiltration membrane, and an ultrafiltration membrane may be used as a filtration membrane, or two or more filtration membranes may be used in combination. Specifically, a filtration membrane having a pore size of 0.05 nm to 0.5 µm can be used in the method according to the present embodiment. For example, the filtration membrane may have a NaCl rejection ratio of 10% or more. The NaCl rejection ratio is a value determined according to the following expression after allowing a NaCl solution (raw water) to pass through a filtration membrane to give a permeate and measuring the NaCl concentrations of raw water and the permeate.

NaCl rejection ratio (%)=(1−(NaCl concentration of permeate)/(NaCl concentration of raw water))×100

The form of the filtration membrane is not limited, and may be, for example, a flat membrane, may be spiral, or may be tubular. When a plurality of filtration membranes are used in combination, single membranes may be arranged in series, or a so-called composite membrane obtained by stacking a plurality of membranes in advance may be used. In membrane filtration, the filtration pressure may be suitably set according to the filtrate to be treated, the type of the filtration membrane to be used, and the like.

Permeated Liquid

By membrane filtration using the filtration membrane described above, a permeated liquid is obtained from which at least a part of the components contained in the filtrate is removed. When the filtrate contains a fluorine-containing surfactant, a permeated liquid having a lower concentration of the fluorine-containing surfactant than the filtrate can be obtained. In this case, the concentration of the fluorine-containing surfactant in the permeated liquid is preferably 10.0 mg/L or less and more preferably 0.5 mg/L or less. Further preferably, the permeated liquid is substantially free of the fluorine-containing surfactant. When the permeated liquid is substantially free of a fluorine-containing surfactant that may cause environmental concerns, the permeated liquid can be discharged into the surrounding environment as discharge water. Alternatively, the permeated liquid may be reused in the fluorine-containing polymer production step. For example, the permeated liquid can be used as a washing liquid in the fluorine-containing polymer production step.

Concentrated Liquid

Due to the membrane filtration described above, a concentrated liquid is obtained in which the components contained in the filtrate are concentrated. When the filtrate contains a fluorine-containing surfactant, a concentrated liquid having a higher concentration of the fluorine-containing surfactant than the filtrate can be obtained. The concentration of the fluorine-containing surfactant in the concentrated liquid can be changed by suitably setting the conditions of membrane filtration. For example, depending on the concentration of the fluorine-containing surfactant in the aqueous fluid, membrane filtration conditions, and the like, the method according to the present embodiment makes it possible to concentrated liquid the fluorine-containing surfactant contained in the aqueous fluid about 20 fold.

In this way, the method according to the present embodiment makes it possible to recover the fluorine-containing surfactant contained in the aqueous fluid in the form of a concentrated liquid. The fluorine-containing surfactant contained in the concentrated liquid may be recovered by adsorption that will be described below. As a matter of course, the concentrated liquid containing the fluorine-containing surfactant may be reused as-is in the fluorine-containing polymer production step without post-treatment such as adsorption or, alternatively, the concentrated liquid after further receiving a fluorine-containing surfactant may be reused in the fluorine-containing polymer production step.

In the method according to the present embodiment, the number of carbon atoms in the fluorine-containing surfactant is preferably 9 or less. For example, when the fluorine-containing surfactant is a fluorine-containing carboxylic acid or a salt thereof, the number of carbon atoms in the fluorine-containing surfactant is preferably 2 to 9 and more preferably 2 to 7. When the fluorine-containing surfactant is a fluorine-containing sulfonic acid or a salt thereof, the number of carbon atoms in the fluorine-containing surfactant is preferably 2 to 9, more preferably 3 to 9, and even more preferably 4 to 9.

In another example, when the fluorine-containing surfactant is a fluorine-containing carboxylic acid or a salt thereof, the number of carbon atoms in the fluorine-containing surfactant is preferably 4 to 9 and more preferably 4 to 7. When the fluorine-containing surfactant is a fluorine-containing sulfonic acid or a salt thereof, the number of carbon atoms in the fluorine-containing surfactant is preferably 2 to 7 and more preferably 4 to 7.

With the number of carbon atoms in the fluorine-containing surfactant being in the above range, gelation of the concentrated liquid may be avoided. This is based on the findings that gelation of the concentrated liquid concerns to the hydrophilicity of the fluorine-containing surfactant, and that the higher the hydrophilicity of the fluorine-containing surfactant is, the less likely the gelation occurs.

(Adsorption)

Figure 3:
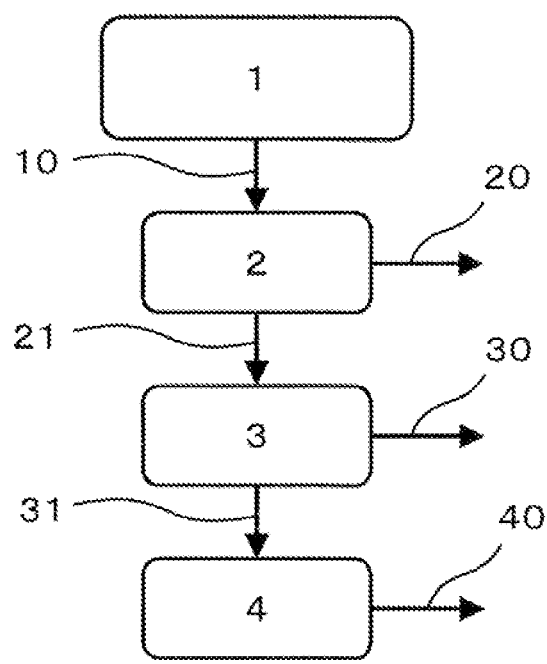
FIG. 3 is a schematic diagram illustrating another modification of the embodiment shown in FIG. 1 FIG. 1.

In some cases, the method according to the present embodiment may further include contacting the concentrated liquid with an adsorbent. FIG. 3 schematically shows the method of the present embodiment when the concentrate is contacted with an adsorbent.

As shown in FIG. 3, the concentrated liquid 31 obtained by the membrane filtration 3 described above is contacted with an adsorbent (adsorption 4). Accordingly, the components (such as a fluorine-containing surfactant) contained in the concentrated liquid 31 are adsorbed onto the adsorbent, thus giving a discharge liquid 40 having a lower concentration of components such as a fluorine-containing surfactant than the concentrated liquid 31. This adsorption 4 may be performed in an adsorption apparatus.

When the concentrated liquid contains a fluorine-containing surfactant, the concentration of the fluorine-containing surfactant in the discharge liquid obtained by the above-described adsorption is preferably 10.0 mg/L or less and more preferably 0.5 mg/L or less. Further preferably, the discharge liquid is substantially free of a fluorine-containing surfactant. When the discharge liquid is substantially free of a fluorine-containing surfactant that may cause environmental concerns, the discharge liquid can be discharged into the surrounding environment. Alternatively, the discharge liquid may be reused in the fluorine-containing polymer production step. For example, the discharge liquid can be used as a washing liquid in the fluorine-containing polymer production step.

When discharge water contains a component such as aluminum sulfate derived from the flocculant used in the fluorine-containing polymer production step, a flocculant such as aluminum sulfate may also be recovered from discharge water and reused in the fluorine-containing polymer production step.

On the other hand, components contained in the concentrated liquid are recovered by being adsorbed onto an adsorbent. When the concentrated liquid contains a fluorine-containing surfactant, the fluorine-containing surfactant can be recovered by the method according to the present embodiment. The recovered fluorine-containing surfactant may be reused in the fluorine-containing polymer production step.

According to the method of the present embodiment, when the concentrated liquid contains a fluorine-containing surfactant, the removal ratio of the fluorine-containing surfactant contained in the concentrated liquid may be, for example, 90% or more and specifically 99.9% or more. The removal ratio of the fluorine-containing surfactant can be determined according to the following expression:

$$\text{Removal ratio of fluorine-containing surfactant (\%)}= (1-(y/x))\times 100$$

wherein x is the concentration (ppm) of the fluorine-containing surfactant in the concentrated liquid, and y is the concentration (ppm) of the fluorine-containing surfactant in the discharge liquid discharged from the adsorption apparatus. The fluorine-containing surfactant is highly efficiently removed as described above, and thereby the effluent may be discharged into the surrounding environment or may be reused in the fluorine-containing polymer production step.

Adsorbent

The adsorbent usable in the method according to the present embodiment is not limited, and various adsorbents such as an ion exchange resin, activated carbon, and zeolite can be used. In the adsorption step, one adsorbent may be used singly, or two or more adsorbents may be used in combination. The adsorbent is preferably an ion exchange resin or activated carbon. When the concentrated liquid contains a fluorine-containing surfactant, the use of an ion exchange resin or activated carbon as an adsorbent may increase the fluorine-containing surfactant adsorption ratio. When activated carbon is used as an adsorbent, activated carbon is preferably highly activated carbon. The use of highly activated carbon can further increase the fluorine-containing surfactant adsorption ratio than conventional activated carbon. The adsorbent is more preferably an ion exchange resin. The use of an ion exchange resin can even further increases the fluorine-containing surfactant adsorption ratio.

The ion exchange resin may be either a cation exchange resin or an anion exchange resin. The anion exchange resin may be, for example, an ion exchange resin having an amino group and/or a quaternary ammonium group as a functional group. The ion exchange resin is preferably a strongly basic anion exchange resin. The basicity of the anion exchange resin can be variously set according to the polymer skeleton and/or the type of functional group. Commercially available anion exchange resins may be used, and, for example, Diaion™ SA Series manufactured by Mitsubishi Chemical Corporation, A200 manufactured by Purolite, and Amberlite™ Series manufactured by Organo Corporation are usable. The cation exchange resin may be, for example, an ion exchange resin having a carboxylic acid group and/or a sulfonic acid group as a functional group. The acidity of the cation exchange resin can be variously set according to the polymer skeleton and/or the type of functional group. Commercially available cation exchange resins may be used, and, for example, Diaion™ SK Series manufactured by Mitsubishi Chemical Corporation, C100 manufactured by Purolite, and Amberlite™ Series manufactured by Organo Corporation are usable.

Activated carbon preferably has a specific surface area of 500 to 2000 m$^2$/g, and more preferably has a specific surface area of 1000 to 2000 m$^2$/g. The form of activated carbon is not limited, and may be, for example, a pellet, granular, powdery, or spherical particle form. Activated carbon may be a commercial product. Examples of commercially available products of activated carbon include Shirasagi™ manufactured by Osaka Gas Chemicals Co., Ltd., Filtrasorb™ CAL, Diahope™, and Diasorb™ manufactured by Calgon Carbon Japan, and Evadia™ series manufactured by Swing Corporation.

An adsorption apparatus usable in the method according to the present embodiment is not limited as long as the adsorption apparatus is furnished with the adsorbent described above, and various adsorption apparatuses may be suitably used according to the purpose. The adsorption apparatus may be, for example, a packing column packed with an adsorbent and, specifically, it may be an ion exchange column or an activated carbon column.

[System for Treating Aqueous Fluid Resulting from Fluorine-Containing Polymer Production Step]

Next, the system according to one embodiment of the present invention will now be described. The system according to the present embodiment is a system for treating an aqueous fluid resulting from a fluorine-containing polymer production step, the system comprising a first filtration apparatus that separates the aqueous fluid into solid components and a filtrate using a filter aid. The system according to the present embodiment may include a first filtration apparatus that separates an aqueous fluid into solid components and a filtrate using a filter aid and a filter aid retaining member.

The system according to the present embodiment may further include a second filtration apparatus that separates the filtrate into a permeated liquid and a concentrated liquid using a filtration membrane.

When the system according to the present embodiment includes the second filtration apparatus, the system may further include an adsorption apparatus equipped with an adsorbent, wherein the adsorption apparatus contacts the concentrated liquid obtained in the second filtration apparatus with the adsorbent.

Details of the first filtration apparatus, solid-liquid separation in the first filtration apparatus, the second filtration apparatus, membrane filtration in the second filtration apparatus, the adsorption apparatus, and adsorption in the adsorption apparatus are as those described above in connection with the method for treating an aqueous fluid.

EXAMPLES

Example 1

In the following Tests 1 to 6, various filter aids and filter aid retaining members were used to perform solid-liquid separation of an aqueous fluid resulting from a fluorine-containing polymer production step.

(Test 1)

In Test 1, a mixed discharge liquid containing 5 liters of discharge water resulting from a fluoroelastomer production step, 1 liter of discharge water resulting from a fluororesin production step, and 4 liters of diluent water was used as an aqueous fluid. This aqueous fluid was an acidic fluid having a pH of about 3, and the concentration of fluoroalkylcarboxylic acid having 6 carbon atoms (perfluorohexanoic acid) that is a fluorine-containing surfactant was about 150 ppm. The aqueous fluid contained about 24 to 41 ppm of an uncoagulated polymer and about 170 ppm of a particulate polymer having a particle size of about 0.1 to 0.2 μm as solid components and, moreover, aluminum sulfate as a flocculant derived from the fluororesin production step. A filtration column having a diameter of 30 mm and a height of 300 mm was used as a first filtration apparatus for performing solid-liquid separation. A filter aid retaining member (made of polypropylene) having an opening size of 20 μm was attached to this filtration column. Diatomaceous earth having a volume average particle size (an average particle size) of 13 μm as measured by a laser diffraction particle size distribution measurement apparatus was used as a filter aid. Body feed and precoat were used in combination as a mode of using the filter aid. As for body feed, the filter aid was added to the aqueous fluid such that the filter aid concentration was 60 ppm. Body feed was performed by introducing the mixed discharge liquid into a beaker, adding the filter aid in an amount such that the concentration of the filter aid in the mixed discharge liquid was 60 ppm while stirring the mixed discharge liquid with a stirrer, and then feeding the mixture to the upper part of the filtration column by a tube pump. As for precoat, a filter aid layer having a thickness of 5 mm (corresponding to 1 g) was formed on the surface of the filter aid retaining member.

The aqueous fluid described above was introduced into the filtration column at a constant rate to separate the aqueous fluid into solid components and a filtrate. During solid-liquid separation, the amount of the filtrate treated (the volume of the filtrate passed through the filter aid and the filter aid retaining member) and the change over time of filtration pressure were recorded. In each test, the "average filtration rate" was determined by dividing the total amount of the filtered aqueous fluid by the total filtration time. The results are shown in Table 1 below. The resulting filtrate was continuously filtered by allowing it to pass through a filter having a pore size of 0.2 μm, and the dry weight of the solid component captured by the filter was measured. The "filtrate quality" shown in Table 1 refers to a value obtained by dividing the dry weight of the solid component by the amount (the volume) of the treated filtrate.

(Tests 2 to 5)

Tests 2 to 5 were performed in the same manner as in Test 1 except that the types of the filter aid and the filter aid retaining member were changed to those shown in Table 1. The results are shown in Table 1.

(Test 6)

In Test 6, filter sand shown in Table 1 was used in place of diatomaceous earth as a filter aid. In Test 6, solid-liquid separation was performed by allowing an aqueous fluid to pass through a layer of filter sand provided inside the filtration column without using a filter aid retaining member. An aqueous fluid as treated in Test 1 was used. The results are shown in Table 1. A visual observation of the surface of the filter sand layer after performing Test 6 revealed a polymer in the form of sheet formed on the surface of the filter sand layer. This polymer in the form of sheet is considered to be derived from an uncoagulated polymer contained in the aqueous fluid.

TABLE 1

| Test Number | Filter aid Type | Particle size (μm) | Opening size of filter aid retaining member (μm) | Average filtration rate (m/h) | Filtrate quality (mg/l) |
|---|---|---|---|---|---|
| 1 | Diatomaceous earth | 13 | 20 | 4 | 0.01 |
| 2 | Diatomaceous earth | 35 | 20 | 11 | 0.01 |
| 3 | Diatomaceous earth | 39 | 20 | 11 | 0.03 |
| 4 | Diatomaceous earth | 39 | 5 | 9 | 0.03 |
| 5 | Diatomaceous earth | 74 | 5 | 14 | 0.3 |
| 6 | Filter sand | 450 | — | 7 | 0.7 |

Example 2

Next, in the following Tests 7 to 9, the mode of using the filter aid was changed to perform solid-liquid separation on the aqueous fluid resulting from the fluorine-containing polymer production step.

(Test 7)

In Test 7, the same mixed discharge liquid and filtration column as those used in Test 1 were used as an aqueous fluid and a first filtration apparatus. The same filter aid and filter aid retaining member as those used in Test 5 were used. In Test 7, the mode of using the filter aid was body feed only. As for body feed, the filter aid was added to the aqueous fluid such that the filter aid concentration was 100 ppm. Body feed was performed by introducing the mixed discharge liquid into a beaker, adding the filter aid in an amount such that the filter aid in the mixed discharge liquid was 100 ppm while stirring the mixed discharge liquid with a stirrer, and then feeding the mixture to the upper part of the filtration column by a tube pump.

Figure 4:
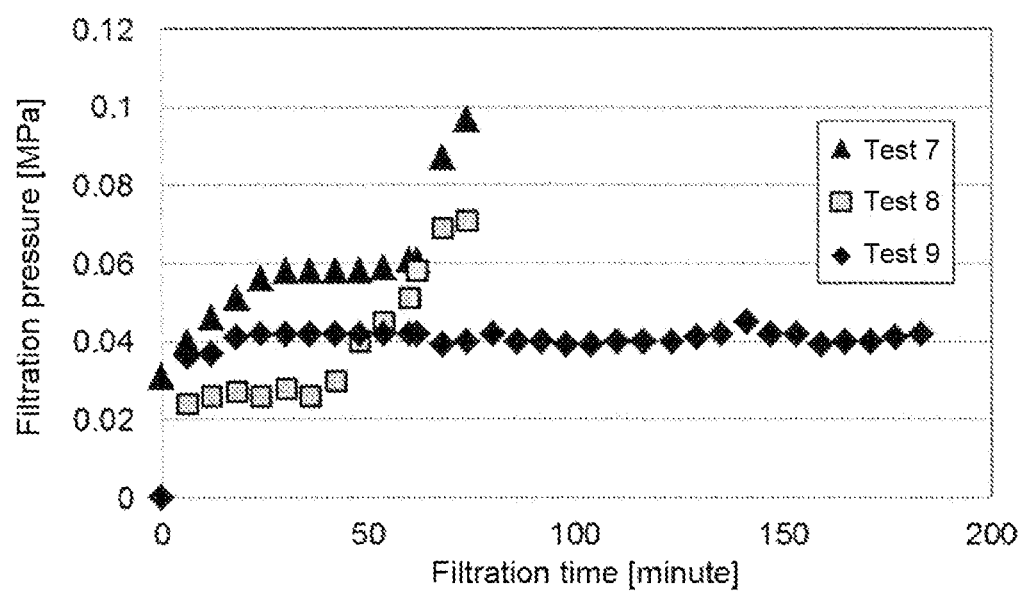
FIG. 4 is a graph showing the results of Example 2.

The aqueous fluid described above was introduced into the filtration column at a constant rate to separate the aqueous fluid into solid components and a filtrate. During solid-liquid separation, the amount of the filtrate treated and the change over time of filtration pressure were recorded. The results of measuring filtration pressure are shown in FIG. 4. The value of filtration pressure 70 minutes and 170 minutes after the beginning of filtration are shown in Table 2 below. The content of solid component (the filtrate quality) in the filtrate was determined in the same manner as in Test 1. The results are shown in Table 2.

(Test 8)

Test 8 was performed in the same manner as in Test 7 except that the mode of using the filter aid was precoat only. In Test 8, as for precoat, a filter aid layer having a thickness of 5 mm (corresponding to 1 g) was formed on the surface of the filter aid retaining member. The results are shown in Table 2 and FIG. 4.

(Test 9)

Test 9 was performed in the same manner as in Test 7 except that body feed and precoat were used in combination as the mode of using the filter aid. In Test 9, as for body feed, the filter aid was added to the aqueous fluid such that the filter aid concentration was 100 ppm. As for precoat, a filter aid layer having a thickness of 5 mm (corresponding to 1 g) was formed on the surface of the filter aid retaining member. The results are shown in Table 2 and FIG. 4.

TABLE 2

| Test Number | Mode of use | Filter aid Particle size (μm) | Opening size of filter aid retaining member (μm) | Filtration pressure (MPa) 30 minutes later | Filtration pressure (MPa) 70 minutes later | Filtrate quality (mg/l) |
|---|---|---|---|---|---|---|
| 7 | Body feed only | 74 | 5 | 0.058 | 0.087 | 0.1 |
| 8 | Precoat only | 74 | 5 | 0.028 | 0.069 | 0.5 |
| 9 | Body feed/ precoat in combination | 74 | 5 | 0.042 | 0.039 | 0.3 |

As shown in Table 2, it was possible to effectively suppress an increase of filtration pressure during solid-liquid separation in Test 9 wherein body feed and precoat were used in combination as compared with Test 7 wherein only body feed was performed and Test 8 wherein only pre-coat was performed. Accordingly, it was found that treatment of an aqueous fluid can be performed with extremely high efficiency over a long period of time by using body feed and precoat in combination. In Test 7 wherein only body feed was performed, it is considered that the filtration pressure increased due to the blocking of the filter aid retaining member as the lapse of the filtration time. In Test 8 wherein only precoat was performed, it is considered that the filtration pressure increased due to the formation of a polymer in the form of sheet on the surface of the filter aid layer formed on the surface of the filter aid retaining member as the lapse of the filtration time. From the results of Example 2, it was found that the blocking of a filter aid retaining member can be prevented, and formation of a polymer in the form of sheet can be suppressed, by using body feed and precoat in combination.

Example 3

Next, in the following Tests 10 to 12, various filtration membranes were used to perform membrane filtration on a filtrate.

(Test 10)

An aqueous solution having a pH of about 3 was prepared wherein the concentration of fluoroalkylcarboxylic acid having 6 carbon atoms (perfluorohexanoic acid) that is a fluorine-containing surfactant was about 150 ppm. Using this aqueous solution as a filtrate, a membrane filtration test was performed with a cross-flow flat membrane tester. A reverse osmosis membrane having a NaCl rejection ratio of 99.7% was used as a filtration membrane. The filtrate was introduced into a feed solution tank, and the filtrate was fed from this feed solution tank to the flat membrane tester and separated into a permeated liquid and a concentrated liquid by membrane filtration. The concentrated liquid concentrated by a flat membrane (a filtration membrane) was returned to the feed solution tank, and membrane filtration was performed until there was no feed solution. The treatment conditions were as follows:

Intermembrane pressure: 0.6 MPa
Amount of circulating flow: 0.6 L/min
Amount of water fed: 1 L The feed solution, the concentrated liquid, and the permeated liquid were collected every 10 minutes from the beginning of supplying the filtrate, and the concentration of the fluorine-containing surfactant was analyzed using high performance liquid chromatography (HPLC). Based on the analysis results, the rejection ratio of the fluorine-containing surfactant in Test 10 was calculated according to the following expression. In the expression, $C_f$ is the concentration (ppm) of the fluorine-containing surfactant contained in the feed solution, $C_b$ is the concentration (ppm) of the fluorine-containing surfactant contained in the concentrated liquid, and $C_p$ is the concentration (ppm) of the fluorine-containing surfactant contained in the permeated liquid. The results are shown in Table 3 below.

$$\text{Rejection ratio } [\%] = \left(1 - \frac{C_p}{(C_f + C_b)/2}\right) \times 100$$

(Tests 11 and 12)

Tests 11 and 12 were performed in the same manner as in Test 10 except that a nanofiltration membrane shown in Table 3 was used as a filtration membrane. The results are shown in Table 3.

TABLE 3

| Test Number | Filtration membrane Type | Nominal NaCl rejection ratio (%) | Fluorine-containing surfactant rejection ratio (%) |
|---|---|---|---|
| 10 | Reverse osmosis membrane | 99.7 | 99.7 |
| 11 | Nanofiltration membrane | 15 | 90.3 |
| 12 | Nanofiltration membrane | 63 | 75.2 |

As shown in Table 3, the rejection ratio of a fluorine-containing surfactant was higher in Test 10 wherein a reverse osmosis membrane was used as a filtration membrane than Tests 11 and 12 wherein a nanofiltration membrane was used. Accordingly, it was found that the fluorine-containing surfactant can be concentrated and recovered with even higher efficiency by using a reverse osmosis membrane as a filtration membrane. A rejection ratio of the fluorine-containing surfactant comparable to those of Tests 10 to 12 can be achieved also when the filtrate obtained by solid-liquid separation similar to Tests 1 to 9 are used to perform the same membrane filtration test as in Tests 10 to 12.

Example 4

Next, in Tests 13 to 15 below, various adsorbents were used to separate and recover a fluorine-containing surfactant contained in a concentrated liquid.

(Test 13)

In Test 13, activated carbon was used as an adsorbent. The concentrated liquid used was obtained by pre-treating the same mixed discharge liquid as the mixed discharge liquid used in Test 1 with a filter having a pore size of 1 μm to remove solid components and then concentrating 20 fold the pre-treated mixed discharge liquid with the same reverse osmosis membrane as the reverse osmosis membrane used in Test 10. A packing column was packed with 40 ml of the adsorbent, and the concentrated liquid described above was allowed to flow from the bottom of the column. Circulation was performed until the concentration of the fluorine-containing surfactant at the outlet was the same as the concentration of the fluorine-containing surfactant at the inlet. The fluorine-containing surfactant concentration of the fluid at the outlet was analyzed by HPLC. Based on the analysis results, the weight of the fluorine-containing surfactant adsorbed onto the adsorbent was determined from the decrease of the fluorine-containing surfactant concentration, and the fluorine-containing surfactant adsorption ratio was calculated according to the following expression. In the expression, A is the weight (g) of the fluorine-containing surfactant adsorbed onto the adsorbent, and B is the volume (ml) of the adsorbent. The results are shown in Table 4 below.

Adsorption ratio (g/ml)=$A/B$ (Tests 14 and 15)

Tests 14 and 15 were performed in the same manner as in Test 13 except that the adsorbents shown in Table 4 were used. The results are shown in Table 4.

TABLE 4

| Test Number | Adsorbent Type | Specific surface area (m²/g) | Adsorbance (g/ml) |
|---|---|---|---|
| 13 | Activated carbon | 1000 | 0.238 |
| 14 | Highly activated carbon | 2000 | 0.338 |
| 15 | Strongly basic anion exchange resin | | 0.396 |

As shown in Table 4, the fluorine-containing surfactant adsorption ratio was higher in Test 14 wherein highly activated carbon was used as an adsorbent than Test 13 wherein conventional activated carbon was used. Moreover, the fluorine-containing surfactant adsorption ratio was higher in Test 15 wherein an ion exchange resin was used as an adsorbent than Tests 13 and 14 wherein activated carbon was used. Accordingly, it was found that the fluorine-containing surfactant can be separated and recovered with a higher yield by using an ion exchange resin as an adsorbent. An adsorption ratio comparable to those of Tests 13 to 15 can be achieved also when the same separation and recovery test as in Tests 13 to 15 is performed on the concentrated liquid obtained by performing the same membrane filtration as in Tests 10 to 12 using the same filtrate that is obtained in the same solid liquid separation as in Tests 1 to 9.

Example 5

Next, in Tests 16 to 18 below, solid-liquid separation for separation into solid components and a filtrate using a filter aid, membrane filtration of a filtrate using a filtration membrane for separation into a permeated liquid and a concentrated liquid, and separation and recovery of a fluorine-containing surfactant contained in the concentrated liquid using an adsorbent were continuously performed.

(Test 16)

The aqueous fluid used in Test 16 was an acidic fluid having a pH of about 3 wherein the concentration of fluoroalkylcarboxylic acid having 6 carbon atoms (perfluorohexanoic acid) that is a fluorine-containing surfactant was about 160 ppm, an uncoagulated polymer and a particulate polymer as solid components were contained in a total amount of about 50 ppm, and, moreover, aluminum sulfate used as a flocculant was contained.

Separation into solid components and a filtrate were performed in the same manner as in Test 9 except that a filter aid having an average particle size of 60 μm or less and a filter aid retaining member having an opening size of 20 μm or less were used. The solid component removal ratio was calculated according to the following expression. In the expression, α is the filtrate quality (mg/l) of the aqueous fluid (i.e., raw water prior to separation using a filter aid), and β is the filtrate quality (mg/l) of the filtrate (the filtrate obtained after separation using a filter aid). The results are shown in Table 5.

Solid component removal ratio (%)=(1−(β/α))×100

(Test 17)

Membrane filtration of a filtrate was performed in the same manner as in Test 10 except that the filtrate obtained in Test 16 was fed to a membrane filtration test. The fluorine-containing surfactant rejection ratio in Test 17 was calculated. The results are shown in Table 5 below.

(Test 18)

The fluorine-containing surfactant contained in a concentrated liquid was separated and recovered in the same manner as in Test 14 except that the concentrated liquid obtained in Test 17 was used. The fluorine-containing surfactant removal ratio was calculated according to the following expression. In the expression, x is the concentration (ppm) of the fluorine-containing surfactant in the concentrated liquid, and y is the concentration (ppm) of the fluorine-containing surfactant (ppm) in the discharge liquid discharged from the packing column packed with the adsorbent. The results are shown in Table 5.

Fluorine-containing surfactant removal ratio (%)=(1−(y/x))×100

TABLE 5

| Test Number | Step | Result | |
|---|---|---|---|
| 16 | Solid-liquid separation by filter aid (first filtration apparatus) | Solid component removal ratio | 99.9% or more |
| 17 | Membrane filtration of filtrate using filtration membrane (second filtration apparatus) | Fluorine-containing surfactant rejection ratio | 99.9% or more |

TABLE 5-continued

| Test Number | Step | Result | |
|---|---|---|---|
| 18 | Separation and recovery of fluorine-containing surfactant using adsorbent | Fluorine-containing surfactant removal ratio | 99.9% or more |

INDUSTRIAL APPLICABILITY

The method and system according to the present invention can highly efficiently remove or recover a fluorine-containing compound such as a fluorine-containing surfactant that may be present in an aqueous fluid such as a waste liquid resulting from a fluorine-containing polymer production step, therefore the environmental load can be reduced, and the recovered fluorine-containing surfactant can be reused as an emulsifier.

REFERENCE SIGNS LIST

1 Fluorine-containing polymer production step
10 Aqueous fluid
2 Solid-liquid separation
20 Solid component
21 Filtrate
3 Membrane filtration
30 Permeated liquid
31 Concentrated liquid
4 Adsorption
40 Discharge liquid

The invention claimed is:

1. A method for treating an aqueous fluid comprising a fluorine-containing surfactant resulting from a fluorine-containing polymer production step, the method comprising:
    separating the aqueous fluid into a solid component and a filtrate using a filter aid, wherein the solid component comprises at least one of an uncoagulated polymer and a particulate polymer, and the separation is conducted with the filter aid by combining body feed and precoat; and
    separating the filtrate into a permeated liquid and a concentrated liquid using a filtration membrane,
    wherein the filter aid is diatomaceous earth having an average particle size of 20 μm or more and 60 μm or less.

2. The method according to claim 1, wherein the solid component comprises the uncoagulated polymer.

3. The method according to claim 1, wherein the filter aid additionally comprises at least one selected from the group consisting of filter sand, perlite, and cellulose.

4. The method according to claim 1, wherein the aqueous fluid is separated into the solid component and the filtrate by pressure filtration.

5. The method according to claim 1, wherein the filtrate has a pH of less than 5.

6. The method according to claim 1, wherein the fluorine-containing surfactant is one or more selected from the group consisting of a fluorine-containing carboxylic acid represented by formula (i) below and a salt thereof:

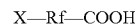

(i)

wherein X is H, F, or Cl; and Rf is a $C_{1-20}$ linear or branched fluoroalkylene group, a $C_{1-20}$ group having a monooxyfluoroalkylene group, or a $C_{1-20}$ group having a polyoxyfluoroalkylene group.

7. The method according to claim 1, wherein the filtration membrane is a reverse osmosis membrane, a nanofiltration membrane, or an ultrafiltration membrane.

8. The method according to claim 7, wherein the filtration membrane is a reverse osmosis membrane.

9. The method according to claim 1, further comprising contacting the concentrated liquid with an adsorbent.

10. The method according to claim 9, wherein the adsorbent is an ion exchange resin or activated carbon.

* * * * *